(12) United States Patent
Mohr (10) Patent No.: US 7,685,842 B2
(45) Date of Patent: Mar. 30, 2010

(54) INVERT MECHANISM FOR A GLASSWARE FORMING MACHINE

(75) Inventor: Paul B. Mohr, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 354 days.

(21) Appl. No.: 11/639,931

(22) Filed: Dec. 15, 2006

(65) Prior Publication Data

US 2008/0141718 A1    Jun. 19, 2008

(51) Int. Cl.
C03B 7/14  (2006.01)
C03B 9/00  (2006.01)
C03B 35/04 (2006.01)

(52) U.S. Cl. .............................. 65/260; 65/232; 65/235; 65/236

(58) Field of Classification Search .................. 65/260, 65/232, 235, 236
See application file for complete search history.

(56) References Cited

U.S. PATENT DOCUMENTS

| | | | |
|---|---|---|---|
| 1,826,019 A | 10/1931 | Peiler | |
| 3,233,999 A | 2/1966 | Mumford | |
| 3,617,233 A | 11/1971 | Mumford | |
| 3,670,583 A | 6/1972 | Leming | |
| 4,340,413 A * | 7/1982 | Rowland | 65/375 |
| 4,461,637 A | 7/1984 | Jones et al. | |
| 4,542,661 A | 9/1985 | Teramachi | |
| 4,637,827 A | 1/1987 | Nebelung et al. | |
| 4,842,636 A * | 6/1989 | Libert | 65/232 |
| 5,814,119 A | 9/1998 | Jones et al. | |
| 6,098,427 A | 8/2000 | Kirkman | |
| 6,314,762 B1 | 11/2001 | Kirkman | |
| 2003/0167799 A1 | 9/2003 | Tijerina-Ramos et al. | |
| 2005/0005647 A1 | 1/2005 | Shue et al. | |
| 2005/0120750 A1 | 6/2005 | Leidy et al. | |

FOREIGN PATENT DOCUMENTS

EP     1252110 A0    10/2002

OTHER PUBLICATIONS

NSK, "Quick Assembly Tapered Roller Bearings" May 29, 2001.*

(Continued)

*Primary Examiner*—Steven P Griffin
*Assistant Examiner*—Cynthia Szewczyk (57) ABSTRACT

An invert mechanism for a glassware forming machine includes a support frame having a base adapted removably to be mounted on a forming machine frame. A linear actuator is suspended from the support frame and a linear gear rack extends from the actuator within the support frame. A hollow shaft has a central portion carried for rotation on the support frame and oppositely extending end portions with axial external splines and open ends. A gear is coupled to the central portion of the shaft for co-rotation with the shaft and has external teeth coupled to the gear rack. A pair of ball nuts are disposed on the end portions of the hollow shaft, and a pair of hollow pneumatic pistons are respectively disposed on the ball nuts over the open ends of the shaft. Invert arm mounts are respectively disposed on the pistons, and a spring is disposed within each piston operatively extending between the piston and the shaft to bias the pistons to a position adjacent to the support frame. An air inlet is disposed on the support frame adjacent to the gear. The gear has an air passage that couples the air inlet to the hollow shaft, and through the shaft to the respective pistons, at least one angular position of the gear and shaft. The invert mechanism is adapted to be mounted as an assembly to the forming machine frame by means of the support frame.

9 Claims, 6 Drawing Sheets

OTHER PUBLICATIONS

Zalud, Todd. Machine Design, "What You Oughta Know About Ball Screws", Jul. 22, 1989.*
Table of contents from Jul. 22, 1989 issue of Machine Design.*
Search results from NSK library website.*

PCT Int'l Application No. PCT/US2007/023856 Int'l Filing Date: Nov. 13, 2007 International Preliminary Report on Patentability—Dated: Feb. 25, 2009.

* cited by examiner

INVERT MECHANISM FOR A GLASSWARE FORMING MACHINE

The present disclosure relates to an invert mechanism for transferring glassware from the blank molds to the blow molds of an individual section glassware forming machine.

BACKGROUND AND SUMMARY OF THE DISCLOSURE

U.S. Pat. No. 3,617,233 discloses a pneumatic invert mechanism for a glassware forming machine in which the neck ring arms are mounted for axial movement along the outer surface of a rack-driven shaft. Air pistons are formed at the opposed ends of the shaft and are coupled to air passages in the shaft to feed air under pressure to the pistons, and thereby open and close the neck ring arms, at the opposed ends of rotation of the shaft.

The present disclosure embodies a number of aspects that can be implemented separately from or in combination with each other.

An invert mechanism for a glassware forming machine, in an exemplary embodiment of the present disclosure, includes a support frame having a base adapted removably to be mounted on a forming machine frame. A linear actuator is suspended from the support frame and a linear gear rack extends from the actuator within the support frame. A hollow shaft has a central portion carried for rotation on the support frame and oppositely extending end portions with axial external splines and open ends. A gear is coupled to the central portion of the shaft for co-rotation with the shaft and has external teeth coupled to the gear rack. A pair of ball nuts are disposed on the end portions of the hollow shaft, and a pair of hollow pneumatic pistons are respectively disposed on the ball nuts over the open ends of the shaft. Invert arm mounts are respectively disposed on the pistons, and a spring is disposed within each piston operatively extending between the piston and the shaft to bias the pistons to a position adjacent to the support frame. An air inlet is disposed on the support frame adjacent to the gear. The gear has an air passage that couples the air inlet to the hollow shaft, and through the shaft to the respective pistons, at at least one angular position of the gear and shaft. The invert mechanism is adapted to be mounted as an assembly to the forming machine frame by means of the support frame.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
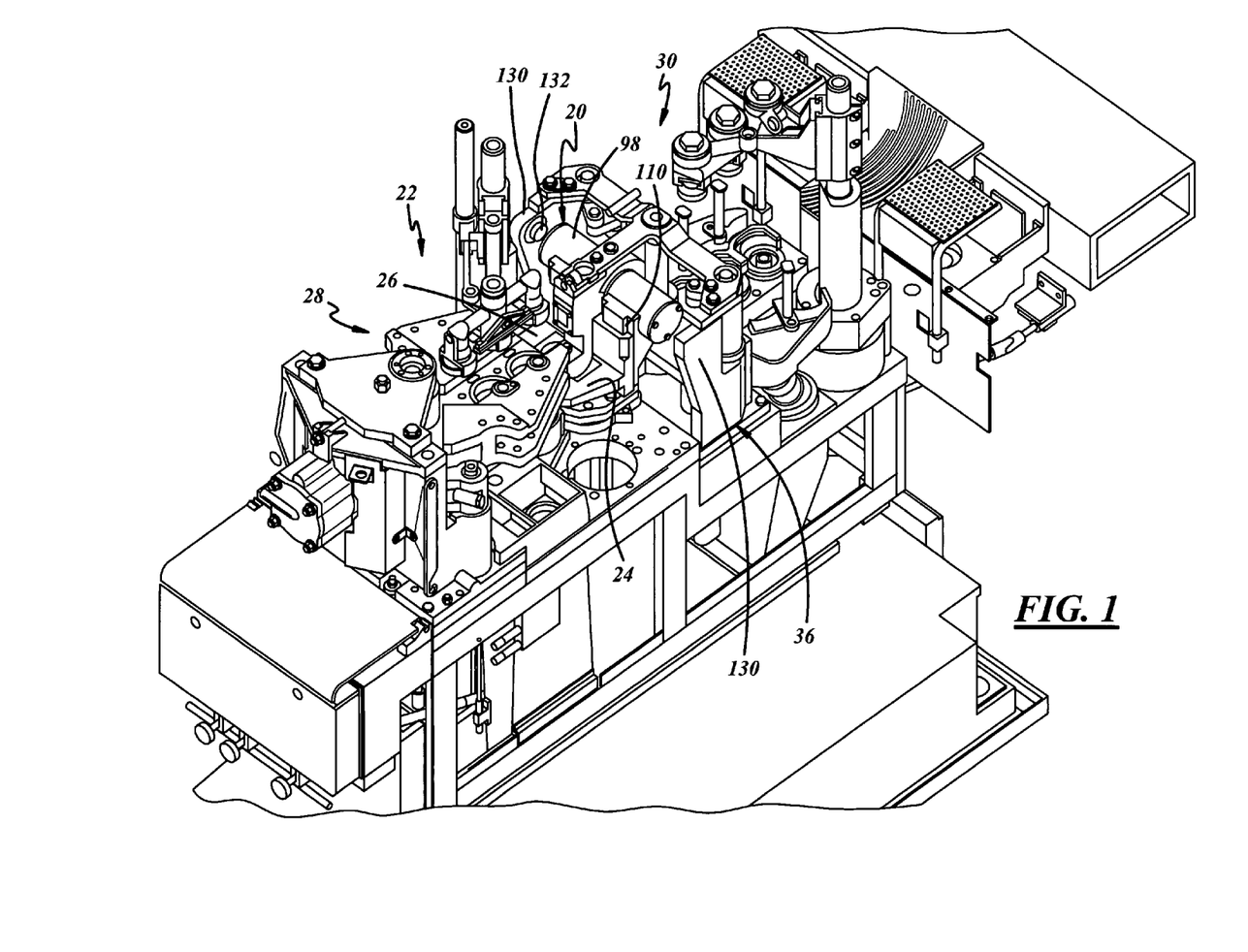
FIG. 1 is a fragmentary perspective view of one individual section of a glassware forming machine in which an invert mechanism, in accordance with an exemplary embodiment of the present disclosure, is disposed.

FIG. 1 is a fragmentary perspective view of an invert mechanism 20, in accordance with an exemplary embodiment of the present disclosure, in a section 22 of an individual section glassware forming machine. Invert mechanism 20 is coupled to a pair of invert arms 24,26 for transferring glass blanks or parisons from the blank mold side 28 to the blow mold side 30 of machine section 22. The machine section configuration in FIG. 1 is for purposes of example only to illustrate an exemplary environment for operation of invert mechanism 20.

Figures 2, 3:
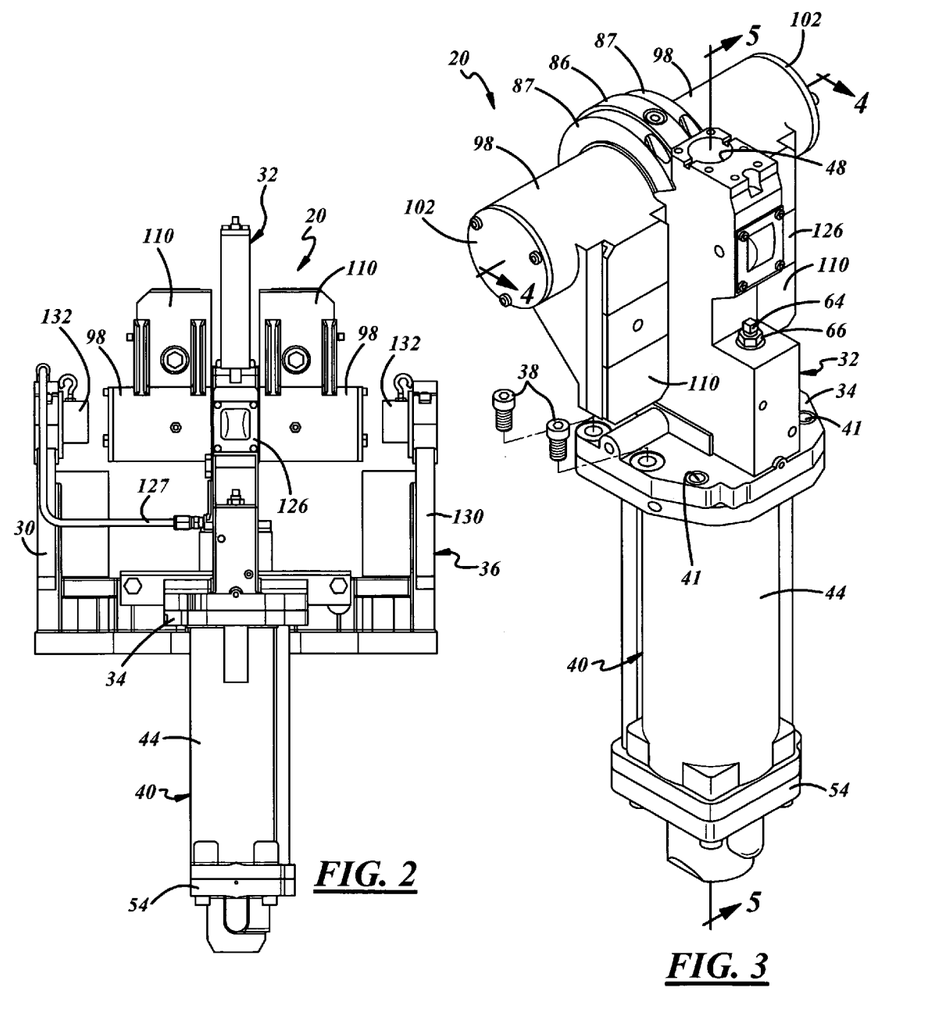
FIG. 2 is an elevational view of the invert mechanism in FIG. 1 mounted on the machine section frame.
FIG. 3 is a perspective view of the invert mechanism in the exemplary embodiment of FIGS. 1 and 2.
Figure 6:
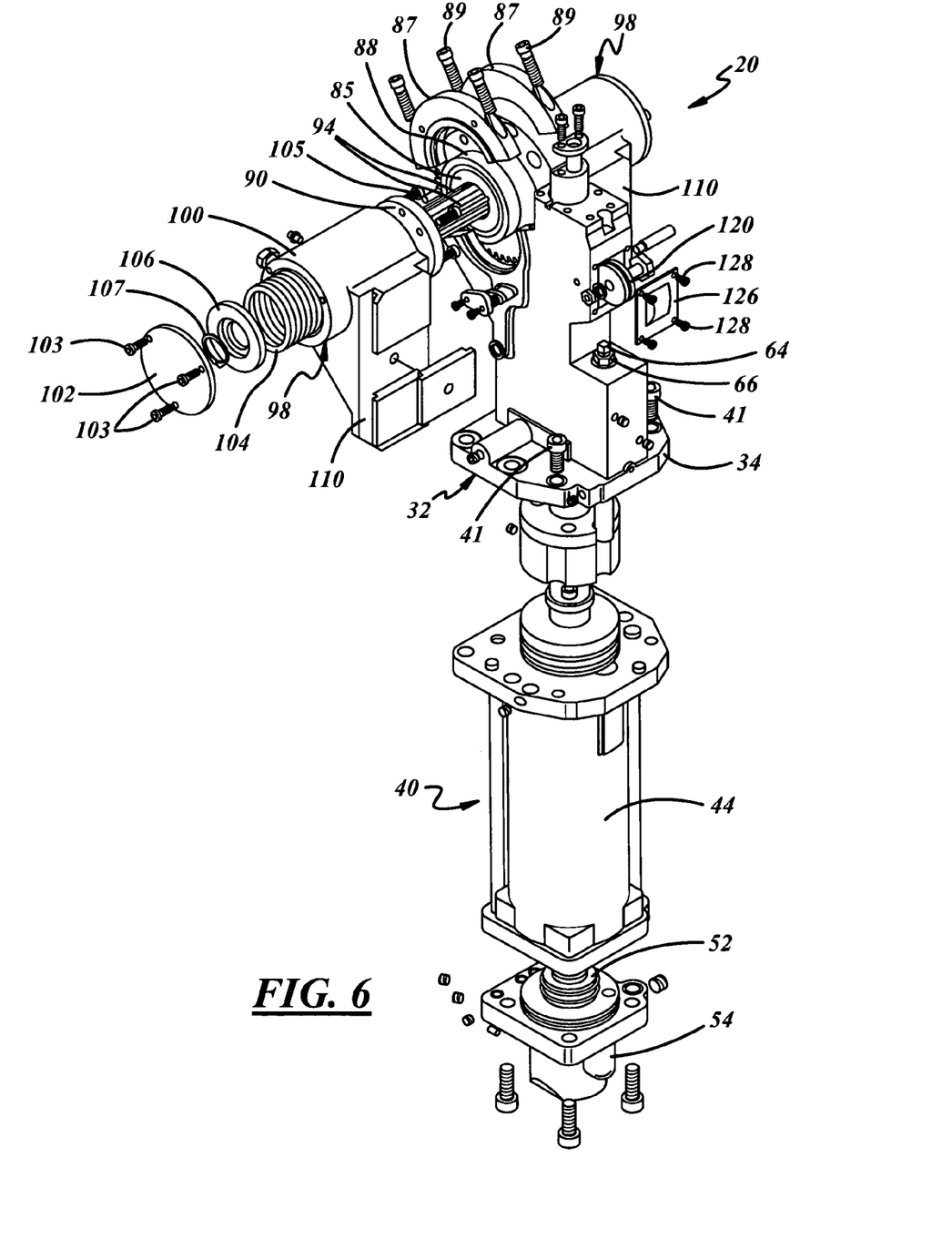
FIG. 6 is a partially exploded perspective view of the invert mechanism in FIGS. 3-5.

Referring to FIGS. 2-6, invert mechanism 20 includes a support frame 32 having a base 34 that is mounted to the frame (FIGS. 1 and 2) of machine section 22 by means of drop-in screws 38 (FIG. 3). In other words, invert mechanism 20 in accordance with the present disclosure preferably is mountable to and demountable from machine section 22 as an assembly to facilitate maintenance and repair of the invert mechanism while continuing operation of the machine section employing a replacement invert mechanism. An actuator 40 is suspended from base 34 of support frame 32 by screws 41 (FIGS. 3 and 6). Actuator 40 preferably is a pneumatic actuator, but may comprise an electric actuator or a hydraulic actuator, for example, without departing from the scope of the present disclosure in its broadest aspects.

Figures 4, 5:
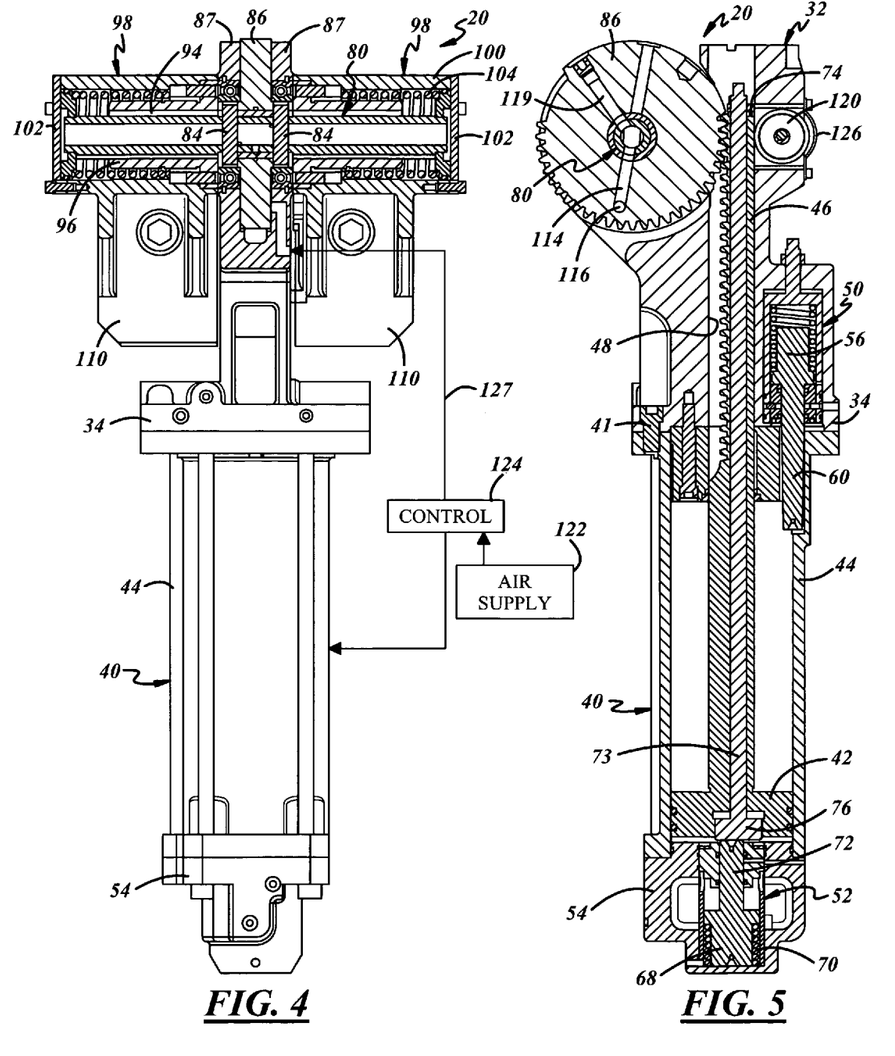
FIG. 4 is a partially sectioned elevational view of the invert mechanism in FIG. 3, being taken substantially along the line 4-4 in FIG. 3.
FIG. 5 is a sectional view taken substantially along the line 5-5 in FIG. 3.
Figure 5A:
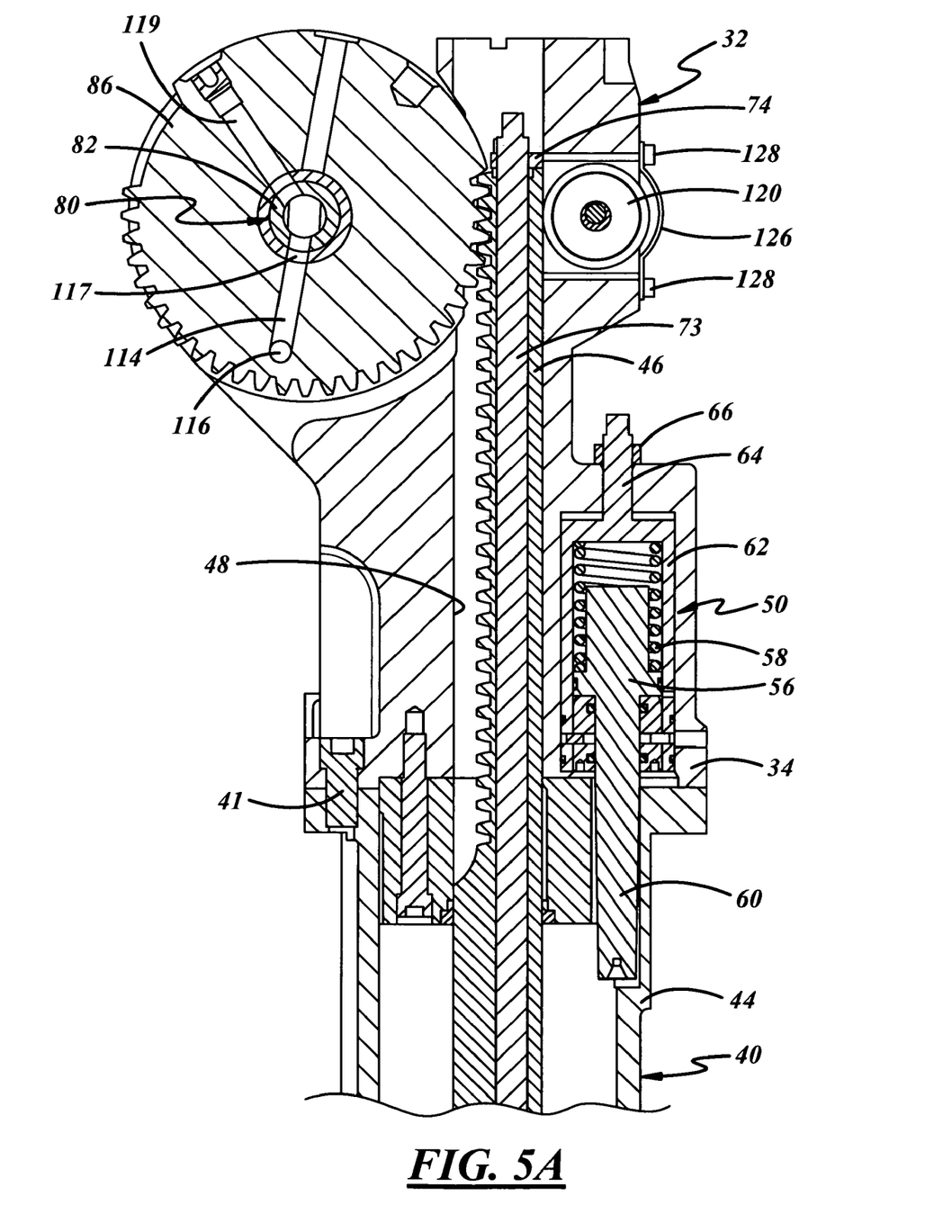
FIG. 5A is an enlargement of the upper portion of FIG. 5.

Referring to FIGS. 5 and 5A, pneumatic actuator 40 includes a piston 42 slidably disposed within a hollow cylinder 44. A linear gear rack 46 extends from piston 42, preferably by being integrally formed with piston 42. Gear rack 46 extends into a through passage 48 within support frame 32. Support frame 32 carries a first cushion 50, and a second cushion 52 is disposed within an end cap 54 carried by cylinder 44. Cushion 50 includes a piston 56 biased by a coil spring 58 and having a piston rod 60 that extends into cylinder 44 of actuator 40. The housing 62 of cushion 50 is adjustably positionable within support frame 32 by means of a housing extension 64 and a nut 66. The fully extended position of rod 60 within actuator 40 thus preferably is adjustable to define the upper cushion-engagement position of piston 42 within cylinder 44. Cushion 52 likewise includes a piston 68 (FIG. 5) coupled to a spring 70 and having a rod 72 extendable into cylinder 44 from end cap 54 for engagement with piston 42 at the lower position of piston travel. A rod 73 (FIGS. 5 and 5A) preferably extends through rack 46 and is coupled at its upper end to a nut 74 for adjustably positioning rod 73 within gear rack 46. The lower end of rod 73 preferably terminates in an enlarged head 76 (FIG. 5) positioned for engagement with rod 72 of cushion 52. Thus, the lower cushion-engagement position of piston 42 and gear rack 46 preferably is adjustable by means of rod 73 and head 76.

Figure 4A:
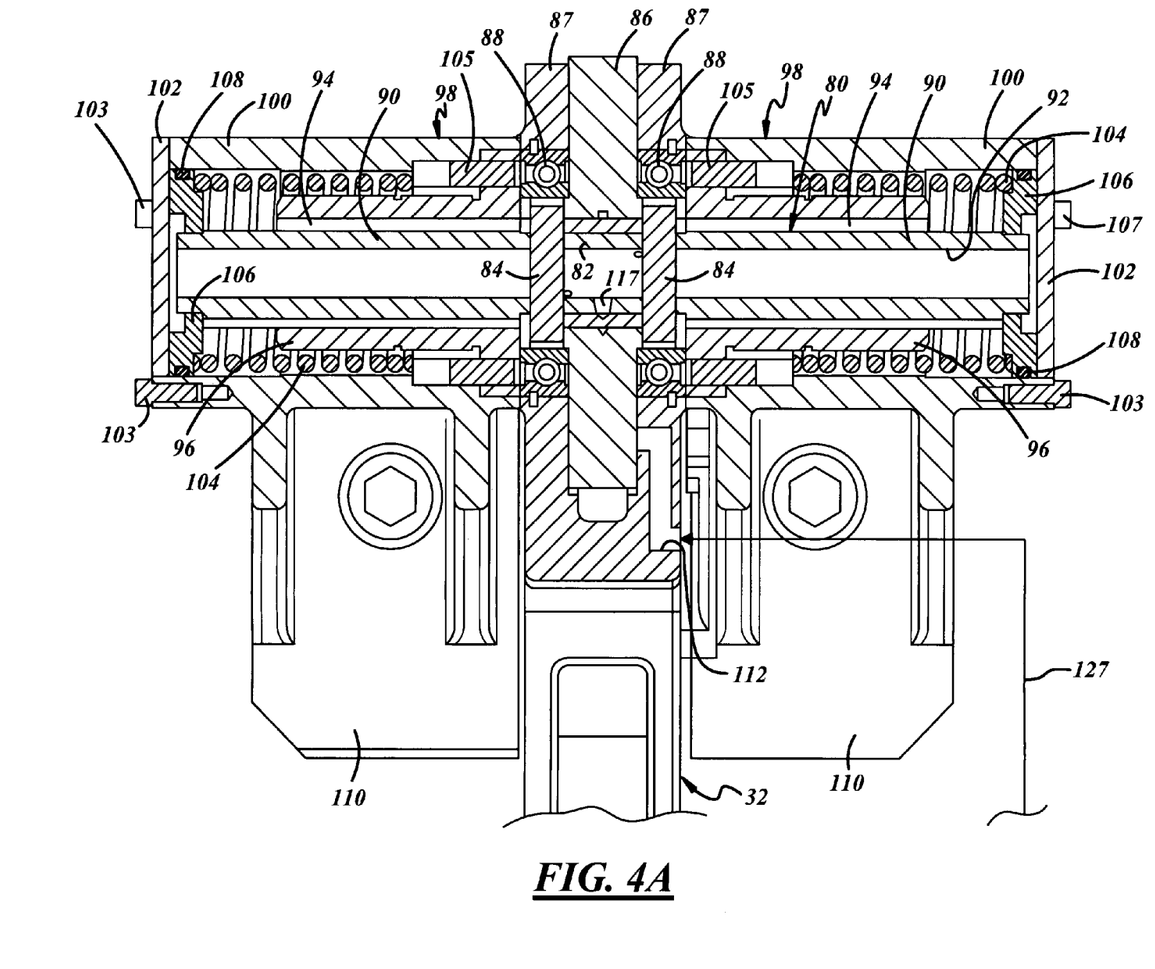
FIG. 4A is an enlargement of the upper portion of FIG. 4.

A hollow shaft 80 (FIGS. 4-6) has a central portion 82 coupled, preferably by pins 84 (FIGS. 4 and 4A), to the central body 85 of a surrounding gear 86. Central body 85 of gear 86 is mounted to support frame 32, preferably by means of bearings 88, so that gear 86 and shaft 80 are conjointly rotatable on the support frame. Bearing mounts 87 and screws 89 mount bearings 88, gear 86 and shaft 80 on support base 32 in the exemplary embodiment. Shaft 80 has respective end portions 90 that extend from opposite sides of gear 86, and a passage 92 extends through shaft 80 between the opposed open ends of the shaft. Shaft 80 has external axially extending splines 94 (FIGS. 4A and 6). A pair of ball nuts 96 are mounted on respective shaft end portions 90. Each ball nut 96 is freely axially movable along associated shaft end portions 90 and is rotatable conjointly with shaft 80 by means of external splines 94.

A pneumatic piston 98 is mounted to each ball nut 96. Each piston 98 preferably includes a hollow cylindrical body 100 and an end cap 102 that extends over the open end of the associated shaft end portion 90. End caps 102 may be secured to bodies 100 by screws 103. Bodies 100 may be secured to bull nuts 90 by screws 105. End cap 102, body 100 and ball nut 96 thus form an enclosed piston 98 that is freely slidable axially along the associated shaft end portion 90 and co-rotatable with shaft 80. A coil spring 104 is captured in compression within each piston 98, preferably between body 100 and a flange 106 secured by a snap ring 107 (FIG. 6) to each end of shaft 80. A seal 108 (FIG. 4A) may surround each flange 106 in sliding sealing engagement with the inside surface of body 100 of piston 98. Thus, the outer end of each piston 98 preferably forms an air-tight cavity between flange 106 and end cap 102. An invert arm mount 110 is disposed on each piston 98, preferably by being integrally formed with hollow body 100 of each piston. Invert arms 24, 26 (FIG. 1) are mounted on mounts 110.

Support frame 32 includes an air inlet 112 (FIGS. 4 and 4A) having an end disposed adjacent to gear 86. Gear 86 has at least one air passage 114 (FIGS. 5 and 5A) with an end 116 disposed for alignment with air inlet 112 at at least one angular position of gear 86. At this angular position of gear 86, inlet 116 of passage 114 is aligned with inlet 112 in support frame 32 to feed air from inlet 112 through gear 86 to hollow interior 92 of shaft 80 through a passage 117 in shaft 80 that is aligned with passage 114 in gear 86. A second air passage 119 can be provided in gear 86 for manually opening the invert arms from the blank side of the machine. This air under pressure is fed through shaft 80 laterally outwardly in both directions through the open ends of the shaft to expand pistons 98 laterally outwardly away from each other, and thereby to move invert arm mounts 110 and invert arms 24,26 (FIG. 1) laterally outwardly away from each other to release a glass blank or parison at blow mold station 30 (FIG. 1). As the invert arms are moved back toward blank station 28 (FIG. 1), gear passage 114 moves out of registry with air inlet 112 so that pistons 98 are depressurized and bring invert arms 24,26 toward each other by the forces of springs 104 during such motion of the invert arms back toward the blank station.

A bearing, preferably a roller bearing 120, is mounted on support frame 32 in engagement, preferably rolling engagement, with the back side of gear rack 46 opposite gear 86. Bearing 120 holds the teeth of gear rack 46 firmly in engagement with the teeth of rotary gear 86 and eliminates backlash between the gears, thereby helping precisely to control the position of invert arms 24,26. A cover 126 may be secured by screws 128 to support frame 32 over bearing 120. A supply 122 (FIG. 4) of air under pressure is connected to a suitable control mechanism 124 for controlling feed of air under pressure through an air line 127 (FIGS. 2 and 4) to air inlet 112 on support frame 32 and to actuator 40 (where a pneumatic actuator is employed, as is preferred). Mold stool 36 (FIGS. 1 and 2) preferably has sides 130 that are disposed outboard of respective pistons 98 in assembly on the machine frame. Stop blocks 132 may be suspended or hung on sides 130 in outboard alignment with the respective pistons. These stop blocks 132 limit outward motion of pistons 98 and invert arms 24, 26 (FIG. 1). Stop blocks 132 can readily be replaced for manufacture of containers of different sizes, and can be removed to permit pistons 98 full outward travel for maintenance or repair purposes.

The invert mechanism of the present disclosure has a number of advantages. The invert mechanism is mounted as an assembly onto the machine frame and can be removed as an assembly for repair or replacement to minimize machine downtime. The mechanism is relatively isolated from heat transfer from the rest of the forming machine. The invert drive mechanism is centrally supported by the support frame. The air supply to the invert support pistons is fed to the pistons from between the pistons, which helps balance and equalize air distribution to and motion at the respective pistons and invert arms. Ball nuts 96 are low friction elements that help balance and equalize motions of the invert (neck ring) arms. The invert mechanism of the present disclosure has been presented in conjunction with an exemplary embodiment, and a number of modifications and variations have been described. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. An invert mechanism for a glassware forming machine, which includes:
   a support frame having a base adapted removably to be mounted on a forming machine frame,
   a linear actuator suspended from said support frame,
   a linear gear rack extending from said actuator within said support frame,
   a hollow shaft having a central portion carried for rotation on said support frame and oppositely extending end portions with axial external splines and open ends,
   a gear coupled to said central portion of said shaft for corotation with said shaft, said gear having external teeth coupled to said gear rack,
   a pair of ball nuts disposed on respective end portions of said hollow shaft and coupled to said external splines so as to be axially movable along said end portions of said hollow shaft and rotatable therewith by way of said external splines,
   a pair of hollow pneumatic pistons respectively disposed on said ball nuts and enclosing opposed ends of said shaft,
   invert arm mounts respectively disposed on said pistons,
   a spring disposed within each of said pistons and operatively extending between said pistons and said end portions of said shaft to bias said pistons to positions adjacent to said support frame, and
   an air inlet on said support frame adjacent to said gear, said gear having an air passage for coupling said air inlet to said hollow shaft at least one angular position of said gear and said shaft to feed air through said hollow shaft to said pistons and thereby move said pistons and said invert arm mounts away from said support frame,
   said mechanism being adapted to be mounted as an assembly to the machine frame by means of said support frame wherein the assembly includes the linear actuator suspended from said support frame and the linear gear rack extending from said actuator within said support frame.

2. The invert mechanism set forth in claim 1 wherein said support frame includes a bearing engaging said gear rack on a side of said gear rack opposite said gear to hold said gear rack in engagement with said gear.

3. The invert mechanism set forth in claim 2 wherein said bearing is a roller bearing in rolling engagement with said gear rack opposite said gear.

4. The invert mechanism set forth in claim 3 wherein said actuator is a pneumatic actuator having an internal piston from which said gear rack extends.

5. The invert mechanism set forth in claim 4 wherein said support frame includes a cushion extending into said actuator for engagement by said internal piston of the actuator at one end of a stroke of said piston.

6. The invert mechanism set forth in claim 5 wherein said actuator includes a second cushion extending into said actuator for engagement by said internal piston of the actuator at a second end of the stroke of said piston.

7. The invert mechanism set forth in claim 6 wherein said first cushion is adjustable, and wherein said actuator includes a shaft adjustably extending through said gear rack and said internal piston of the actuator into engagement with said second cushion.

8. The invert mechanism set forth in claim 3 including stop blocks arranged for removable receipt on a mold stool in outward alignment with said pneumatic pistons to function as stops against outward motion of said pneumatic pistons.

9. The invert mechanism set forth in claim 1 further comprising bearings to mount said gear to said support frame, and bearing mounts to mount said bearings, said gear, and said hollow shaft to said support frame.

* * * * *